US005974516A

United States Patent [19]

Qureshi

[11] Patent Number: 5,974,516

[45] Date of Patent: Oct. 26, 1999

[54] BYTE-WRITABLE TWO-DIMENSIONAL FIFO BUFFER HAVING STORAGE LOCATIONS WITH FIELDS INDICATING STORAGE LOCATION AVAILABILITY AND DATA ORDERING

[75] Inventor: Amjad Z. Qureshi, San Jose, Calif.

[73] Assignee: Samsung Electronics Co., Ltd., Rep. of Korea

[21] Appl. No.: 08/733,510

[22] Filed: Oct. 18, 1996

[51] Int. Cl.[6] .................................................. G06F 12/00

[52] U.S. Cl. ............................ 711/171; 395/872; 711/154

[58] Field of Search .................................... 711/171, 172, 711/156, 170, 154, 158; 395/872, 873, 874, 875, 876

[56] References Cited

U.S. PATENT DOCUMENTS

| | | | |
|---|---|---|---|
| 5,003,469 | 3/1991 | Kamiyama et al. | 711/171 |
| 5,465,079 | 11/1995 | Bouchard et al. | 340/576 |
| 5,535,369 | 7/1996 | Wells et al. | 711/171 |
| 5,563,920 | 10/1996 | Fimoff et al. | 375/354 |

*Primary Examiner*—Tod R. Swann
*Assistant Examiner*—Felix B. Lee
*Attorney, Agent, or Firm*—Skjerven, Morrill, MacPherson, Franklin & Friel LLP; David T. Millers

[57] ABSTRACT

A FIFO storage circuit stores data transferred over a data bus in data groups having of one or more data units. The FIFO buffer includes a number of storage locations each configured to store a single unit of data. Each data groups on the data bus is accompanied by data-size information. A storage-location availability decoder receives the data-size information and allocates a number of consecutive storage locations in the FIFO storage circuit to allow for storage of the incoming data group. The FIFO then stores each unit of the data group, along with a data tag common to each unit, in consecutive storage locations. The next stored data group is then assigned a new data tag. The FIFO storage circuit reads from the storage locations in order of data tag. Checking consecutive storage locations for equivalent data tags enables the FIFO storage circuit to output the appropriate number of units for each data group. Further, assigning unique sequential data tags to each data group allows the FIFO storage circuit to read the contents of FIFO buffer 200 in the appropriate order.

12 Claims, 9 Drawing Sheets

BYTE-WRITABLE TWO-DIMENSIONAL FIFO BUFFER HAVING STORAGE LOCATIONS WITH FIELDS INDICATING STORAGE LOCATION AVAILABILITY AND DATA ORDERING

BACKGROUND

1. Field of the Invention

This invention relates generally to storage buffers for storing serial data, and more particularly to FIFO buffers.

2. Discussion of the Related Art

FIG. 1A depicts a typical data stream in which data is conveyed as data groups of varying length. In the illustrated example a single data group may be one, two, or four 8-byte data units long.

FIG. 1B depicts a conventional FIFO (first in, first out) buffer 100 that includes four 32-byte storage elements 102, 104, 106, and 108. Each storage element includes a valid bit V which stores a logic one to indicate that the respective storage element contains valid data or a logic zero to indicate that the storage element may be overwritten.

Data is written into FIFO buffer 100 via an input bus 110 and read out via an output bus 112. A conventional FIFO control block (not shown) generates write and read pointers for FIFO buffer 100. The write pointer indicates the memory element currently being written to; the read pointer indicates the memory element being read from. The valid bits V are logically combined using conventional logic to avoid overflowing FIFO buffer 100 with data.

FIFO buffer 100 is shown to contain the contents of the data stream of FIG. 1A. The first data group D000, four units long, is stored in storage element 108. Because data group D000 was written to FIFO buffer first (i.e., was "first in"), data group D000 is also read from FIFO buffer first (i.e., is "first out"). The following three data groups D001, D010, and D011 are subsequently stored in respective storage elements 106, 104, and 102.

The shaded storage locations of FIFO buffer 100 illustrate that storing data in data groups of varying length leads to inefficient packing of FIFO buffer 100. The valid bits V of FIFO buffer 100 indicate that FIFO buffer 100 is full despite the presence of five empty storage locations. Consequently, subsequent data coming from input bus 110 must be stalled until data group D000 is read from FIFO buffer 100.

SUMMARY

A FIFO storage circuit stores data transferred over an input bus as data groups that include one or more data units preceded by an indication of the number of data units. A storage-location availability decoder receives the data-size information and allocates a number of consecutive empty storage locations in the FIFO storage circuit to allow for storage of the incoming data group. The data groups are not necessarily stored in consecutive memory locations, nor are they necessarily stored in memory elements of a particular size; instead, the requisite number of storage locations is selected to improve the data storage density of the FIFO buffer. For example, the FIFO storage circuit may store four single-unit data groups, a pair of two-unit data groups, or a single four-unit data group in a single storage element.

Because the data groups are of varying length and are not necessarily stored in sequence, each data group is assigned a unique data tag allowing the data groups to be reordered when read from the FIFO buffer. The data tag for a given data group is stored along with each data unit of that data group so that data units can be identified as belonging to the group.

A FIFO storage circuit in accordance with the present invention allocates storage locations based on size instead of by the order in which they are received. In so doing, the novel FIFO storage circuit provides improved bandwidth and storage efficiency over the prior art.

BRIEF DESCRIPTION OF THE FIGURES

These and other features, aspects, and advantages of the present invention will become better understood with regard to the following description, appended claims, and accompanying figures, where:

DETAILED DESCRIPTION

Figure 1B:
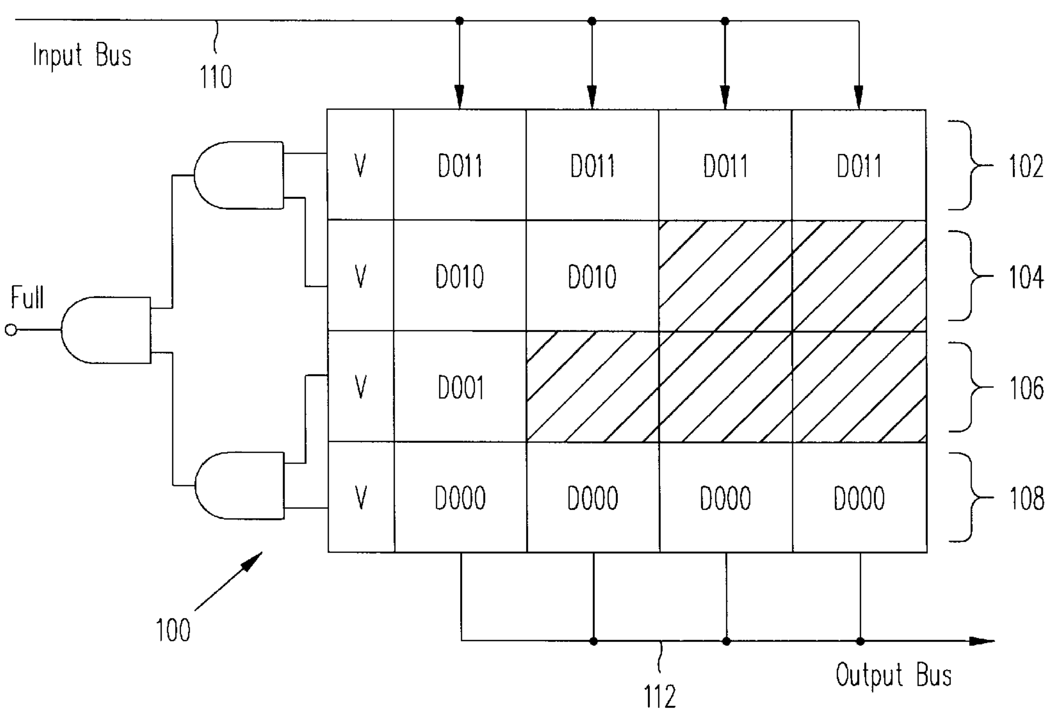
FIG. 1B depicts a conventional FIFO (first in, first out) buffer 100.
Figure 2A:
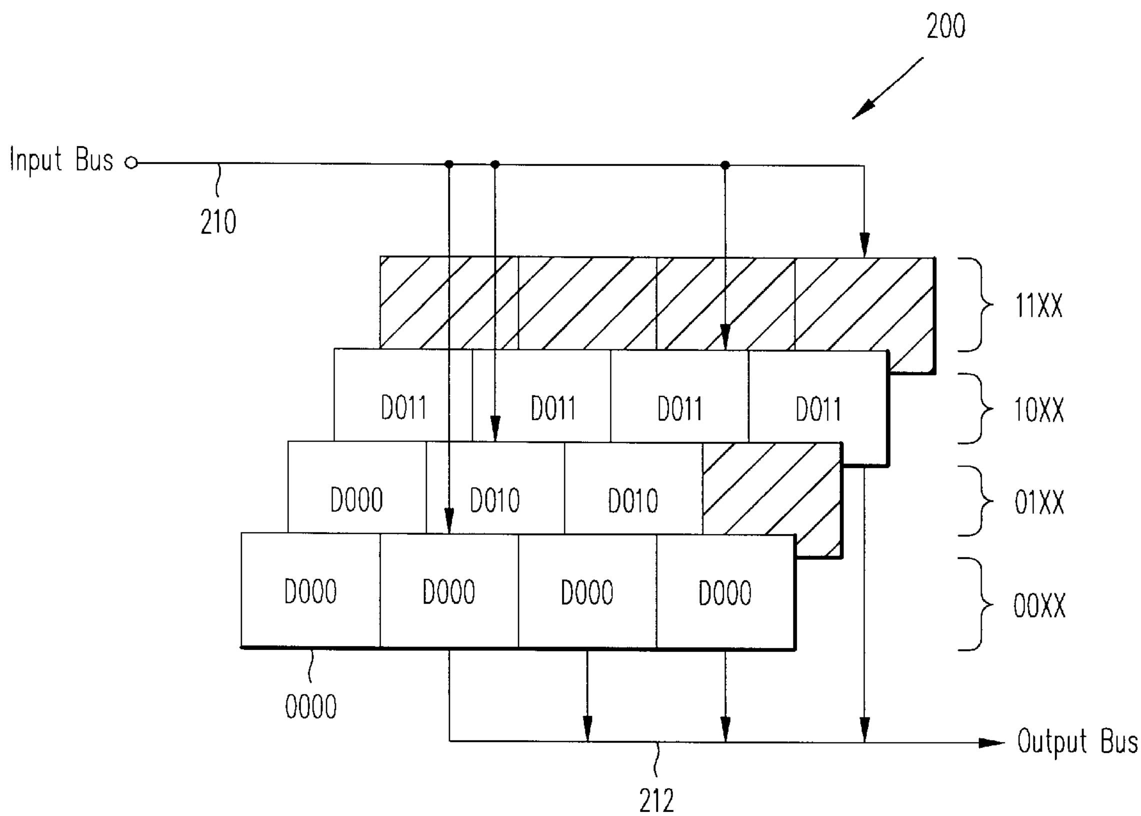
FIG. 2A depicts a FIFO buffer 200 in accordance with the present invention.

FIG. 2A depicts a FIFO buffer 200 in accordance with the present invention. Like FIFO buffer 100 of FIG. 1B, FIFO buffer 200 includes four 32-byte storage elements 00XX, 01XX, 10XX, and 11XX. Data are written into FIFO buffer 200 via an input bus 210 and read out via an output bus 212. A novel write control circuit 430, illustrated in FIG. 4, generates a write pointer WPTR that enables FIFO buffer 200 to write data into FIFO buffer 200 where the data may be stored efficiently. A novel read control circuit 440, also illustrated in FIG. 4, restores the sequence of the data when the data are read out.

Figure 1A:
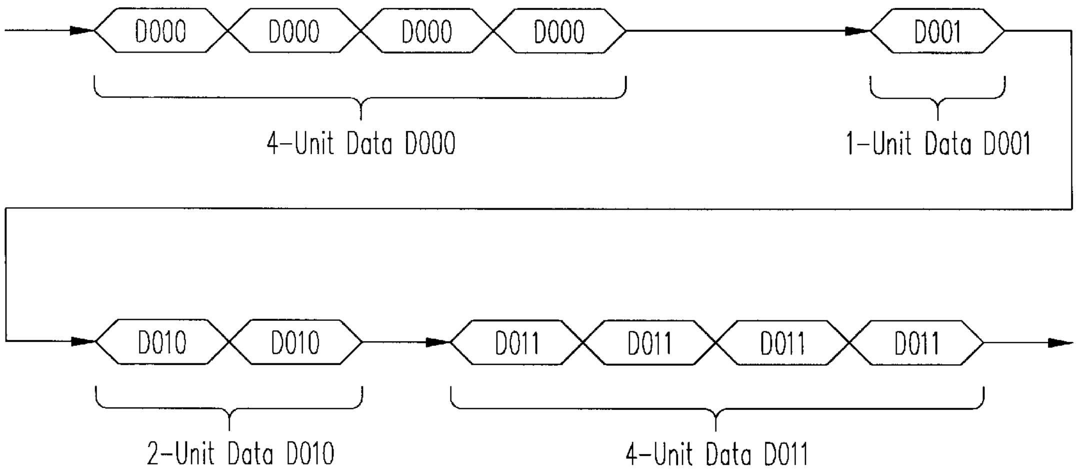
FIG. 1A depicts a typical data stream in which data is conveyed as data groups of varying length.

FIFO buffer 200, like FIFO buffer 100, is shown to contain the contents of the data stream of FIG. 1A. However, the data stream is stored more efficiently in FIFO buffer 200, allowing room for additional data without increasing the number of storage elements. The first two data groups D000 and D001 are stored much as in FIFO buffer 100. However, the third data group D010 is stored not within an empty storage element, but is instead stored within a pair of available storage locations within a storage element 01XX. This leaves storage element 10XX available to store data group D011, which happens to be four units long. Consequently, storage element 11XX is available to store additional data. For example, FIFO buffer 200 may receive an additional data group of 8, 16, or 32 bytes (i.e., one, two, or four data units).

In the example of FIG. 2A, FIFO buffer 200 is capable of storing at least one additional data group as compared to the conventional FIFO buffer 100. Further increases in storage efficiency are realized when smaller data groups are stored. For example, a data stream of only four consecutive single-unit data groups fills prior art FIFO buffer 100. In contrast, FIFO buffer 200 could store a data stream three times as long with one 32-byte storage element to spare.

In the embodiment of FIG. 2A, a data group is written into the first available one of elements 00XX though 11XX having a sufficient number of empty storage locations to store the data group. In some instances, this storage scheme stores data groups out of sequence.

Figure 2B:
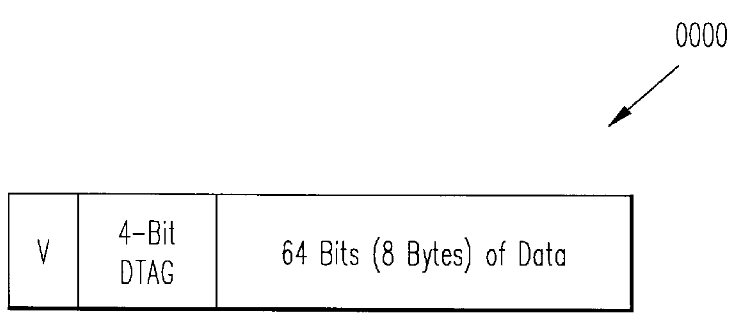
FIG. 2B depicts the valid bit V, data tag DTAG, and 8-byte (64 bit) data word storage areas associated with a particular storage location of FIFO buffer 200.

Storing data groups out of sequence into FIFO buffer 200 requires that data stored within FIFO buffer 200 be read out of sequence to restore the original order of the data. To accomplish this, each storage location 0000 through 1111 includes a four-bit data tag DTAG indicating the storage order of the stored data relative to other data within FIFO buffer 200. Furthermore, because individual storage locations within each storage element may include valid data while other storage locations in the same element do not, each storage location 0000 through 1111 includes a designated valid bit V. The valid bit V, data tag DTAG, and 8-byte (64 bit) data word associated with storage location 0000 are depicted in FIG. 2B.

Figure 3:
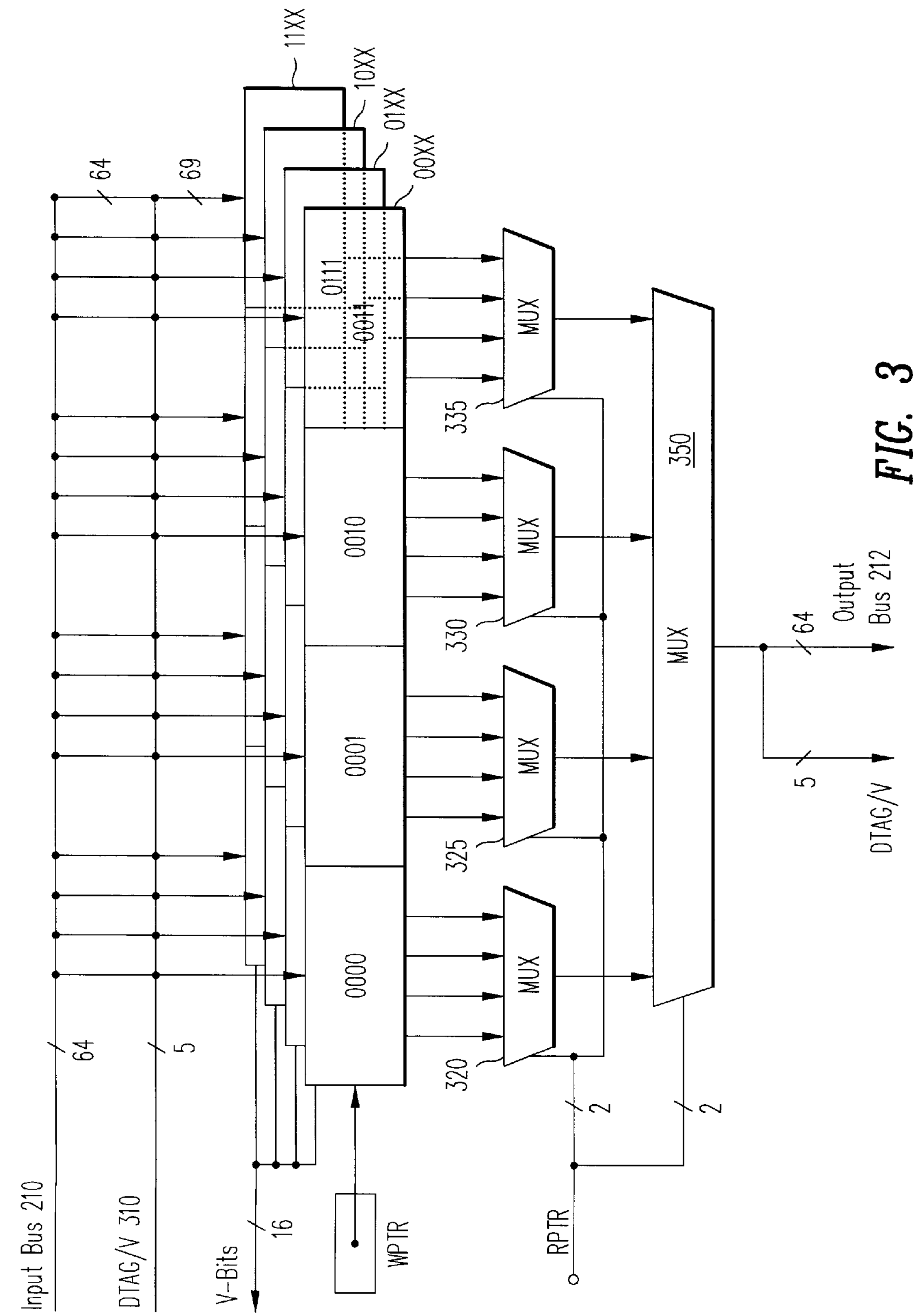
FIG. 3 is a schematic diagram of an embodiment of FIFO buffer 200.

FIG. 3 is a schematic diagram of an embodiment of FIFO buffer 200 including the 16 unique storage locations 0000 through 1111. The numerical descriptors for the storage locations double as their four-bit binary addresses. Storage locations 0000–1111 include 69 input terminals each and are connected in parallel to 64 lines of input bus 210 and to a valid-bit line and four data-tag lines of a 5-bit DTAG/V bus 310. Each of storage locations 0000–1111 also conventionally includes a write terminal that, when selected, enables the selected storage location to be overwritten with the data on input bus 210 and DTAG/V bus 310. The sixteen write terminals are depicted in FIG. 3 as a conventional write pointer WPTR shown selecting storage location 0000.

5-bit DTAG/TV bus 310 is connected to each valid-bit storage location of storage locations 0000–1111. As discussed in connection with FIGS. 4–6, the statuses of the valid bits allow a write central circuit 430 of FIG. 4 to select proper storage locations among the empty storage locations.

FIFO buffer 200 includes two levels of multiplexing to selectively read from among storage locations 0000–1111. Four multiplexers 320, 325, 330, and 350 are controlled by the two most-significant bits of a read pointer RPTR in selecting a storage location among the four storage elements 00XX, 01XX, 10XX, and 11XX. For example, if the two most significant bits of the read pointer RPTR are 00, then storage locations <u>00</u>00, <u>00</u>01, <u>00</u>10, and <u>00</u>11 are selected. Each of multiplexers 320, 325, 330, and 335 includes four 69-bit input ports, each connected to a corresponding storage location. For example, multiplexer 335 is connected to storage locations 0011, 0111, 1011, and 1111.

A fifth multiplexer 350 is controlled by the two least significant bits of read pointer RPTR in selecting a storage location among the 69-bit output ports from multiplexers 320, 325, 330, and 335 and provides the signals from the selected port to output bus 212 and bus DTAG/V. Thus, the combination of multiplexers 320, 325, 330, 335, and 350 enables the read pointer RPTR to select any one of storage locations 0000 through 1111.

Figure 4:
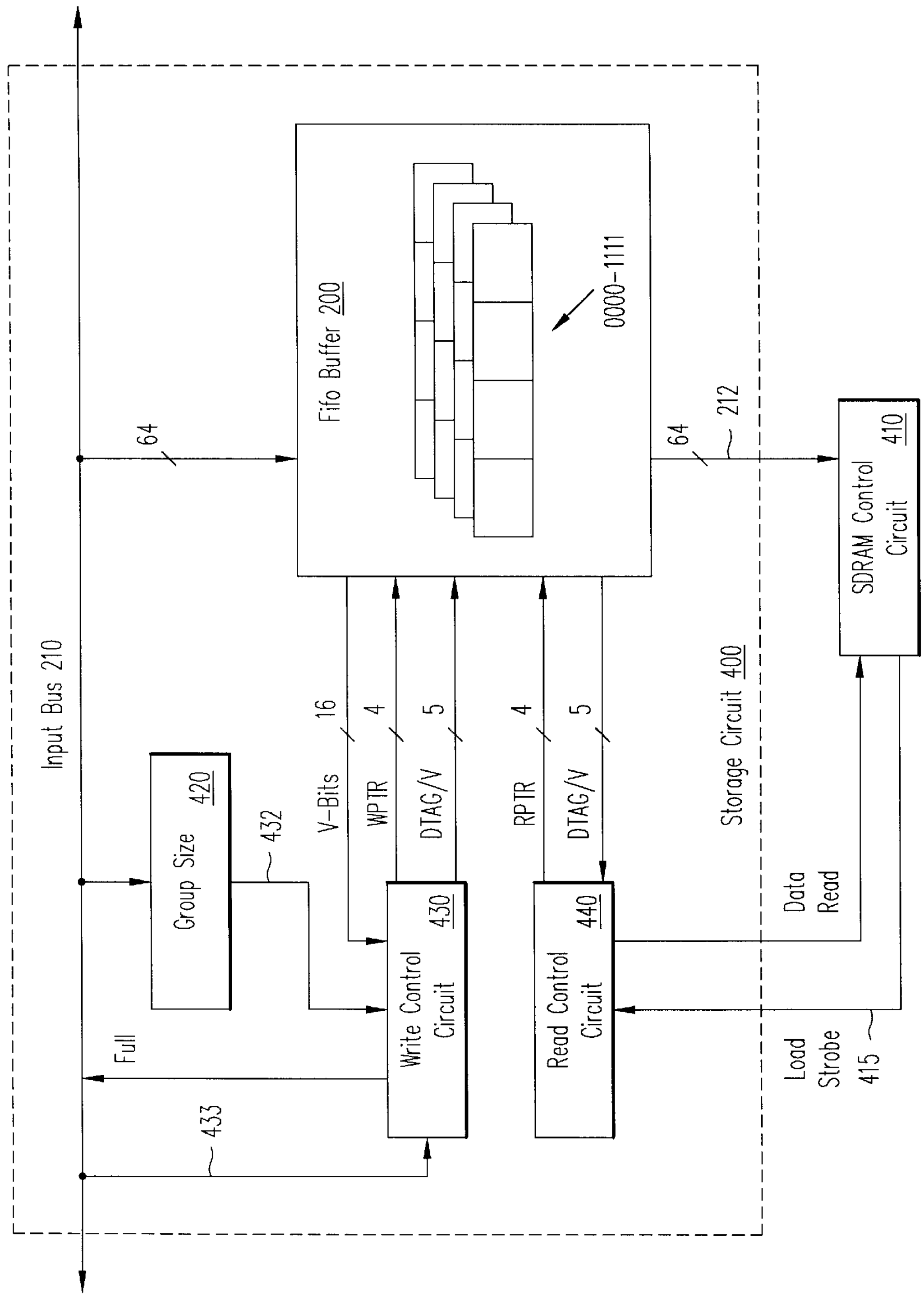
FIG. 4 is a block diagram of a storage circuit 400 including FIFO buffer 200.

FIG. 4 is a block diagram of a storage circuit connected to a conventional SDRAM (Synchronous Dynamic Random Access Memory) memory control circuit 410 via output bus 212 and a load-strobe line 415. Load-strobe line 415 conveys a conventional load strobe from SDRAM control circuit 410 indicating that SDRAM control circuit 410 is ready to receive data on output bus 212. SDRAM control circuit 410 is illustrative; storage circuit 400 may be used in other applications requiring sequential buffering.

Storage circuit 400 includes FIFO buffer 200 (of FIG. 3), a data-group-size register 420, a write control circuit 430, and a read control circuit 440. Size register 420 is connected to input bus 210, and is conventionally configured to receive information indicative of the size, in number of data units, of a subsequently broadcast data group on input bus 210. This size information is conventionally decoded and conveyed to write control circuit 430 via a bus 432.

Write control circuit 430 receives the decoded size information for a given data group via bus 432, and reads the state of valid bits corresponding to storage locations 0000 through 1111 on 16-line V-BITS bus 450. Write control circuit 430 then uses the size information and the status of the various valid-bits to locate a consecutive sequence of storage locations, within a single storage element, capable of storing the data group. Having located an appropriate sequence of storage locations (or a single storage location for a single-unit element), write control circuit 430 selects those locations, in turn, using the write pointer WPTR conveyed to FIFO buffer 200 over a WPTR bus 455. Selecting the write pointer for a given one of storage locations 0000 through 1111 write-enables that location. The write-enabled storage location then stores the data presented on input bus 210, a data tag common to each selected storage location, and a valid bit indicating that the storage location now contains valid data. The data tag and valid bit are conveyed to FIFO buffer 200 via a 5-line DTAG/V bus 445.

When data is stored within FIFO buffer 200, a load strobe from SDRAM control circuit 410 to read control circuit 440 initiates a read from FIFO buffer 200. Read control circuit 440 keeps track of the data tag for the last-read data (LDTAG) and advances a read pointer RPTR on a 4-bit bus 460, to the next one of storage locations 0000 through 1111 that has a set valid bit and a data tag value one greater than the preceding data tag value. Thus, read control circuit 440 reads the data stored within FIFO buffer 200 in the order that the data arrived on input bus 210.

Figure 5:
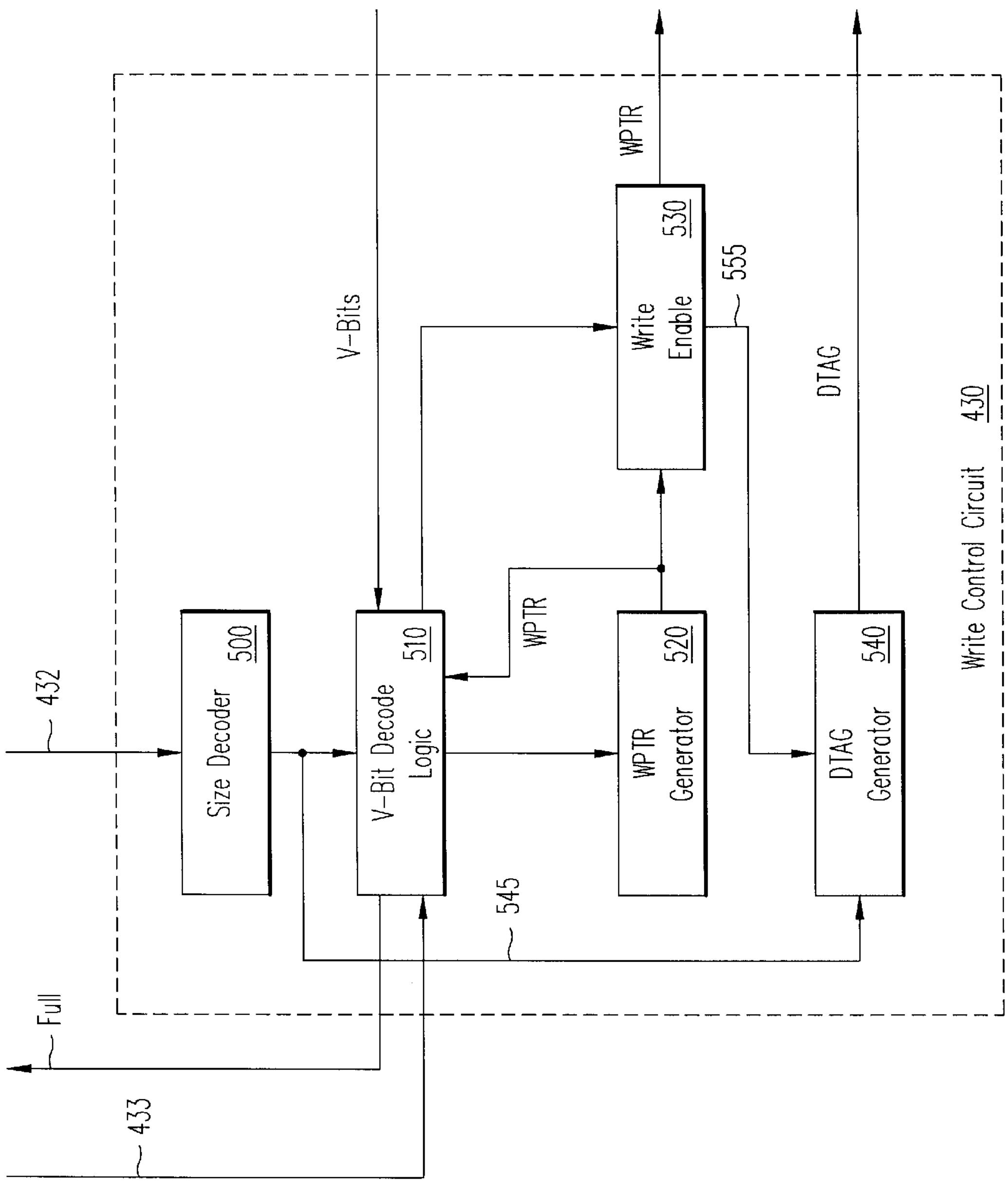
FIG. 5 is a block diagram of a write control circuit for directing data into FIFO buffer 200.

FIG. 5 is a block diagram of write control circuit 430, which includes a data-group size decoder 500, valid-bit decode logic 510, a write-pointer generator 520, a write-enable gate 530, and a data-tag generator 540. Size decoder 500 decodes group-size information on line 432 and indicates to decode logic 510 and DTAG generator 540 (over a bus 545) the number of data units for each data stream received by FIFO buffer 200.

Write-pointer generator 520 is a conventional loadable four-bit counter having an output bus 550 that conveys the write pointer WPTR to decode logic 510. The write pointer WPTR is also conveyed, via a write-enable gate 530, to FIFO buffer 200 each time a unit of data is stored within FIFO buffer 200. Gating the write pointer WPTR to FIFO buffer 200 is initiated via a line 532 and conventionally write enables a selected storage location.

V-bit decode logic 510 decodes the 16 V-bits from FIFO buffer 200 to determine whether FIFO buffer 200 is full and therefore unable to accept additional data. Decode logic 510 may be configured to indicate that FIFO buffer 200 is full before all of the storage locations are filled where it is required to avoid overflowing FIFO buffer 200. For example, in one embodiment, FIFO buffer 200 is considered full though an entire storage element remains empty, thus ensuring sufficient storage for back-to-back write instructions.

Assuming FIFO buffer 200 is not full, decode logic 510 decides, based on the status of the valid bits, the location of the write pointer WPTR, and the size of an incoming data stream, whether the storage location or series of adjacent storage locations addressed by write pointer WPTR have the capacity to store the incoming data stream. Then, if the location indicated by the write pointer WPTR is available, decode logic 510 issues an enable command via lines 555 and 557 to WPTR generator 520, gate 530, and DTAG generator 540. The enable command:

1. gates the current write pointer WPTR to FIFO buffer 200 initiating a load of the addressed storage location;
2. increments the write pointer WPTR to the next storage location; and
3. increments a counter (not shown) within DTAG generator 540 upon receipt of the last unit of a data group.

DTAG generator 540 is a counter circuit that increments by one for each data group. Because data groups differ in size, DTAG generator divides the number of stored units, as indicated by write-enable gate 530 via line 555, by the data group size indicated on line 545. Thus, the data tag is incremented one time for each data group so that each storage location used to store a multi-unit data group contains an identical data tag. DTAG generator 540 also provides a logic one to the valid-bit storage location of selected storage locations so that each time data and a data tag are stored within a storage location the corresponding valid bit is set.

Figure 6A:
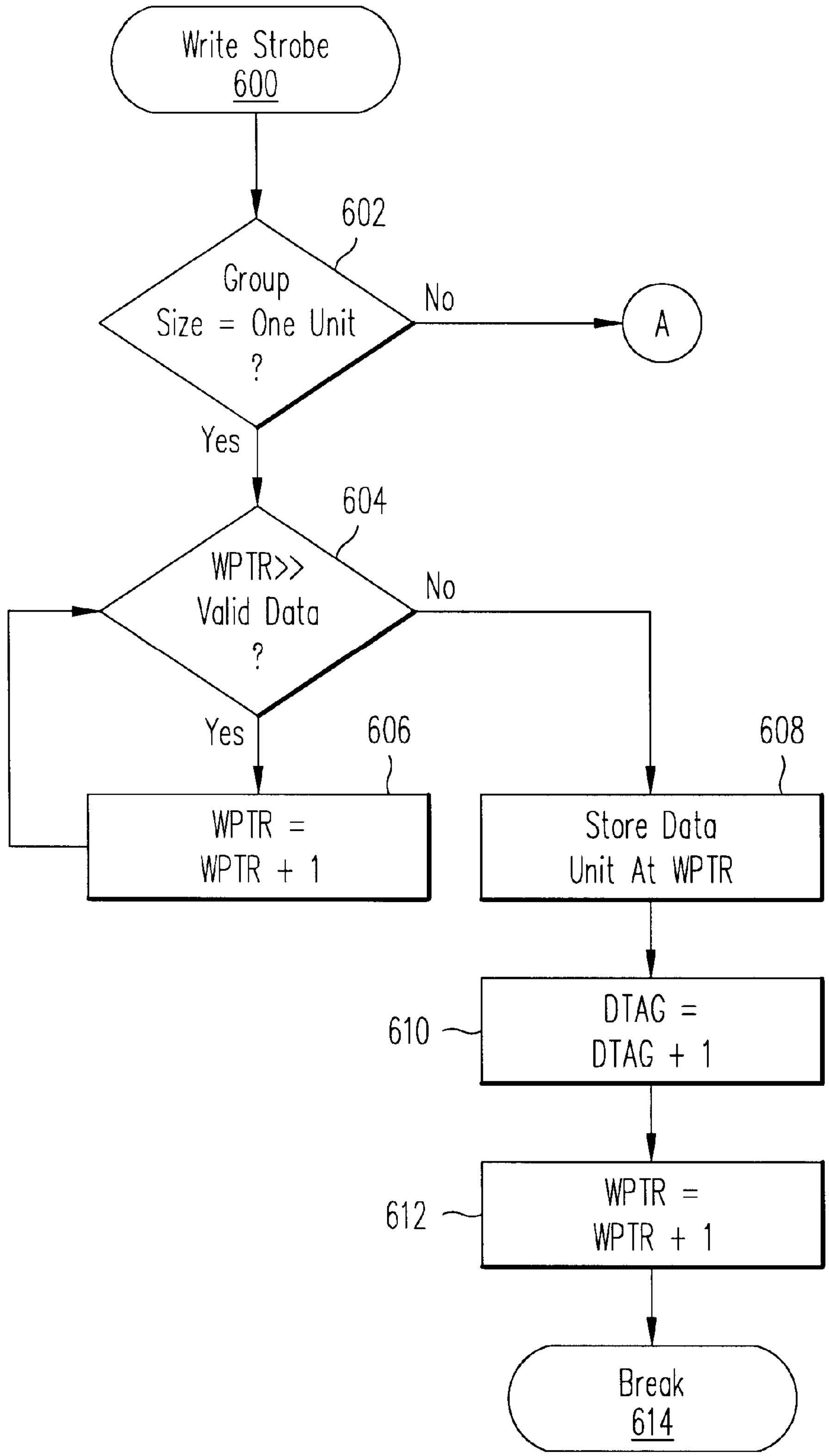
FIGS. 6A, 6B, and 6C combined are a flowchart depicting the operation of V-bit decode logic 510 of FIG. 5.
Figure 6B:
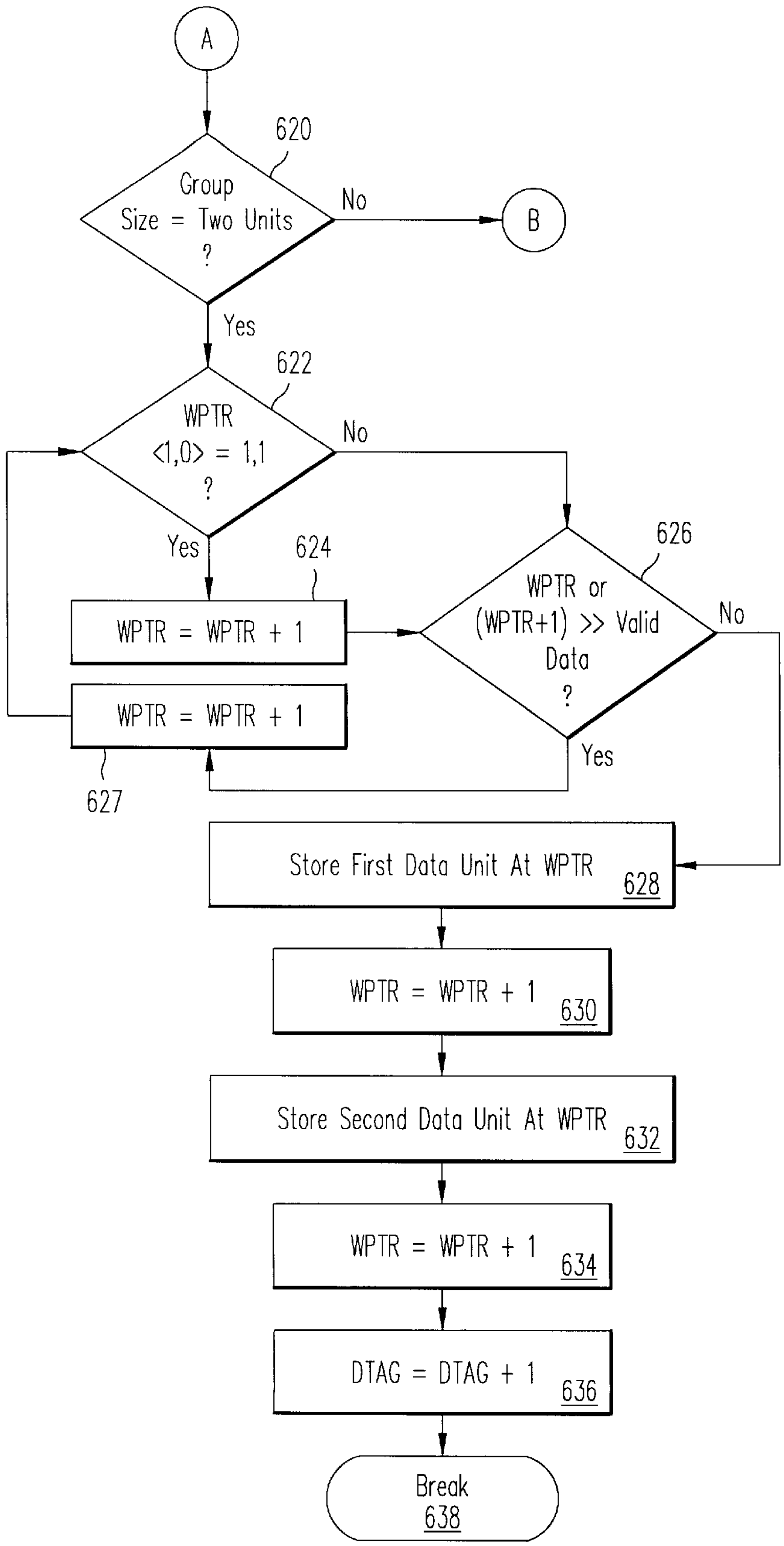
Figure 6C:
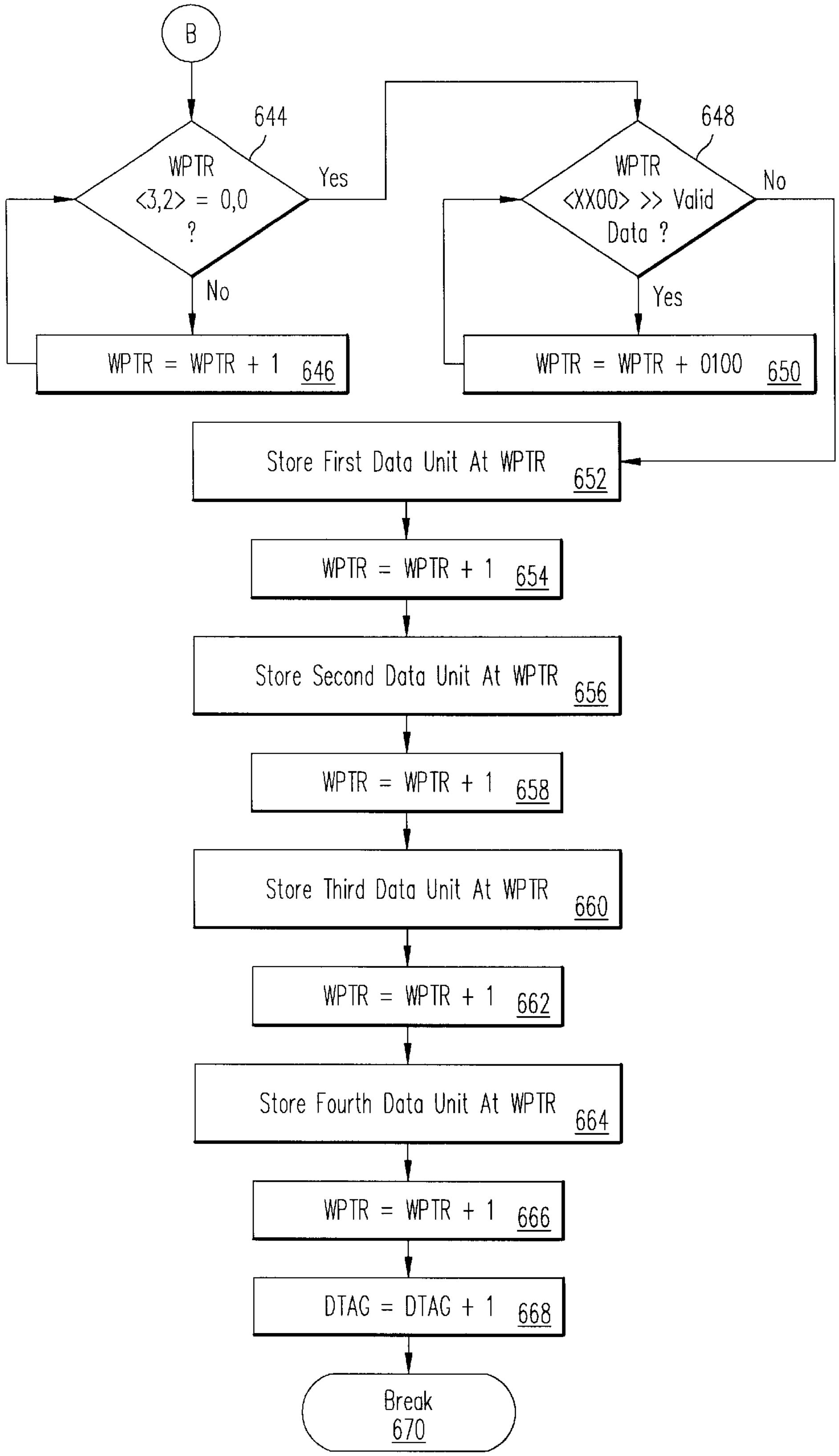

FIGS. 6A, 6B, and 6C combined are a flowchart depicting the operation of V-bit decode logic 510 of FIG. 5. Assuming that FIFO buffer 200 is not full, the process begins at step 600 when write control circuit 430 receives a write strobe on line 433. V-bit control logic 510 inspects the group size of the incoming data group to determine whether the group is one, two, or four units long.

One-unit data groups are stored in the first available one of data locations 0000 through 1111. Thus, if the data group is one unit long, V-bit decode logic 510 checks to see whether the storage location pointed to by write pointer WPTR contains valid data (step 604). If so, then the write pointer WPTR is incremented by one (step 606), and the valid bit of the next storage location is inspected (step 604).

The write pointer WPTR continues to increment until the write pointer WPTR points to an empty storage location (i.e., a storage location lacking valid data). The process then moves to step 608 in which the data unit available on the input bus 210 is loaded into the indicated storage location along with the current data tag DTAG. The valid bit of the indicated storage location is also set in step 608. Then, in preparation for receipt of the next data group, DTAG generator 540 and WPTR generator 520 are each incremented by one (steps 610 and 612). With the single-unit data group stored, the write process ends (step 614) and write control circuit 430 remains idle pending receipt of a subsequent write command.

Returning to step 602, if the data group is not one unit long, then the process moves to step 620 of FIG. 6B. In the embodiment of FIG. 3, multi-unit data groups are stored in consecutive storage locations within a single one of storage elements 00XX, 01XX, 10XX, and 11XX. Storing multi-unit groups in single storage elements is not strictly necessary, but simplifies the decode logic of V-bit decode logic 510. If the write pointer WPTR is pointing to the far right storage location of any storage element (e.g., storage location 0011) then storing a data group of two or more data units would locate that data group in more than one storage element. To prevent such an event the process continues for two-unit data groups to step 622 in which the two least-significant bits of the write pointer WPTR are considered. If both bits are a logic one, then the write pointer WPTR is incremented by one.

Once the write pointer WPTR is not pointing to the last storage location of a storage element, V-bit decode logic 510 determines whether two consecutive storage locations are available to store the two data units. To accomplish this, V-bit decode logic 510 checks the valid-bit statuses of the storage location pointed to by the write pointer WPTR and the storage location having an address of WPTR+1 (step 626). If one or both of those storage locations contain valid data, then write pointer WPTR is incremented by one (step 627) and the process returns to step 622. On the other hand, if those storage locations are both empty, then 1. the valid bit is set, and the first data unit is stored in the storage location pointed to by the write pointer WPTR (step 628);
2. the write pointer WPTR is incremented by one to select the adjacent storage location (step 630); and
3. the valid bit is set, and the second data unit is stored in the adjacent storage location, now selected by the incremented write pointer (step 632).

In preparation for receipt of the next data group, DTAG generator 540 and WPTR generator 520 are each incremented by one (steps 634 and 636). With the two-unit data group stored, the write process ends (step 638) and write control circuit 430 remains idle pending receipt of a subsequent write command.

Returning to step 620, if the data group is neither one nor two units long, the process moves to step 644 of FIG. 6C in which it is assumed that the data group is four units long. Because four-unit data groups occupy an entire one of storage elements 00XX, 01XX, 10XX, and 11XX, write pointer WPTR must be pointed to the first storage location of a given storage element before writing the first data unit. Thus, V-bit decode logic 510 examines the two least significant bits of the write pointer WPTR to determine whether the WPTR is pointing to a storage location having an address of XX00 (step 644). If not, then the write pointer WPTR is incremented by one (step 646) and the process returns to step 644. If the write pointer WPTR is pointing at an address XX00, V-bit decode logic 510 inspects the valid bit of each storage location within the selected storage element to ensure that all storage locations are empty (step 648). If one or more of the storage locations contain valid data, then the write pointer WPTR is incremented by four (binary 0100) so that write pointer WPTR points to the first storage location of the next storage element. V-bit decode logic 510 cycles through steps 648 and 650 until an empty storage element is located. Having located an empty storage element, 1. the valid bit is set, and the first data unit is stored in the storage location pointed to by the write pointer WPTR (step 652);
2. the write pointer WPTR is incremented by one to select the next second storage location of the storage element (step 654);
3. the valid bit is set, and the second data unit is stored in the second storage location (656);
4. the write pointer WPTR is incremented by one to select the third storage location (step 658);
5. the valid bit is set, and the third data unit is stored in the third storage location (660);
6. the write pointer WPTR is incremented by one to select the fourth (and last) storage location of the storage element (step 662); and
7. the valid bit is set, and the fourth data unit is stored in the fourth storage location (664).

In preparation for receipt of the next data group, DTAG generator 540 and WPTR generator 520 are each incremented by one (steps 666 and 668). With the four-unit data group stored, the write process ends (step 670) and write control circuit 430 remains idle pending receipt of a subsequent write command.

Figure 7:
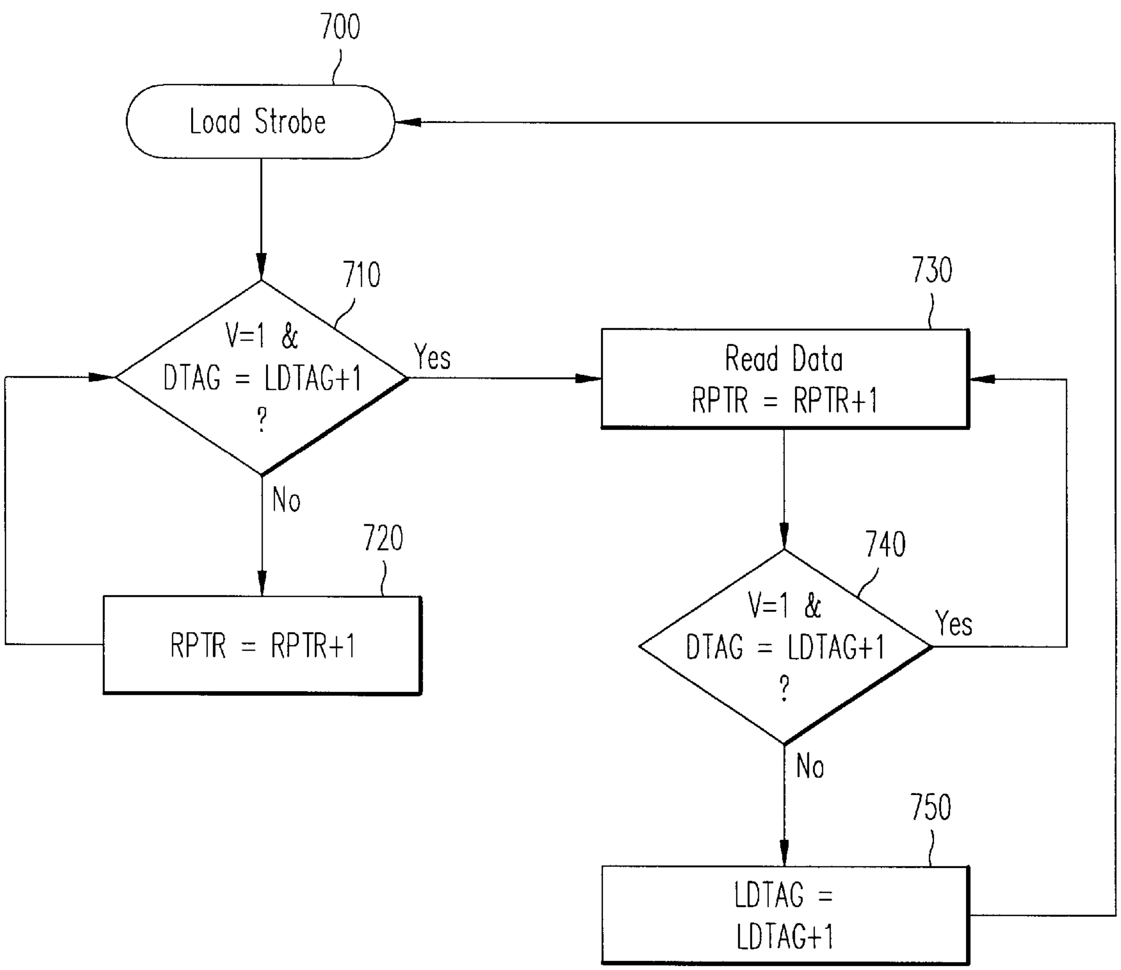
FIG. 7 is a flowchart depicting the operation of read control circuit 440 of FIG. 4.

FIG. 7 is a flowchart depicting the operation of read control circuit 440 of FIG. 4. The process begins when storage circuit 400 receives a load strobe from SDRAM control circuit 410 via line 415 (FIG. 4). Read control circuit 440 maintains data tag LDTAG which is the last data tag value of a data group read from FIFO buffer 200. In decision 710, read control circuit 440 examines the valid bit and the data tag DTAG stored in the storage location selected by the read pointer RPTR. If the valid bit is a logic zero, indicating the absence of valid data, or if data tag DTAG is not exactly one greater than the last DTAG value LDTAG, then the process moves to step 720, in which the read pointer RPTR is incremented, before returning to step 710.

If in step 710 the valid bit is a logic one, indicating the presence of valid data, and the data tag DTAG is one greater than the last DTAG value LDTAG, then the process moves to step 730. The read pointer RPTR is then incremented before returning to step 710, so that read control circuit 440 can inspect the valid and DTAG bits of the next storage location.

Read control circuit 440 cycles through steps 710 and 720 until it locates a storage location having valid data and the correct data tag DTAG. The process then moves to step 730 in which read control circuit 440 instructs SDRAM control circuit 410 to read the data supplied from the selected storage location on output bus 212.

In step 740, read control circuit 440 examines the valid bit and the data tag DTAG stored in the next storage location. If that storage location includes valid data (i.e., the V-bit is a logic one), and the data tag DTAG is once again equal to LDTAG+1, then the data unit stored within the selected storage location is part of the same data group as the data unit stored in the previously selected storage location. Consequently, the selected storage location is also read in response to the same load strobe. Steps 730 and 740 continue until the read pointer RPTR reaches a storage location that either does not include valid data or does not include a data tag DTAG equal to one greater than the last DTAG value LDTAG. The process then returns to step 700 and waits for the next load strobe.

Because each multi-unit data group is stored in consecutive storage locations each having a common data tag, checking for consecutive storage locations for equivalent data tags enables read control circuit 440 to output the appropriate number of units for each data group. Further, assigning unique sequential data tags to each data group allows read control circuit 440 to read the contents of FIFO buffer 200 in the appropriate order.

Although the present invention has been described in considerable detail with reference to certain preferred versions thereof, other versions are possible. For example, while the present invention is described in the context of FIFO buffers, the invention is equally applicable to other types of sequential buffers, such as LIFO (last-in, first-out) buffers. Moreover, the present invention is applicable to data units and groups of various sizes in addition to those described above. Therefore, the spirit and scope of the appended claims are not limited to the description of the preferred versions contained herein.

What is claimed is:

1. A first-in-first-out (FIFO) buffer for storing data received over a data bus, wherein the data are transferred in data groups including at least one unit of data, the FIFO buffer comprising:

a plurality of storage locations, each of the storage locations being connected the data bus and configured to store one data unit, wherein each of the storage location comprises a first storage area for an associated data unit, a second storage area for a valid flag indicating whether the storage location contains valid data, and a third storage area for a data tag indicating an order of storage of the associated data unit relative to other data units in the storage locations; and a write control circuit comprising:

a data-group size decoder connected to receive information indicating a number of data units in a data group to be written to the storage locations during a write operation; and a write pointer generator connected to the storage locations and to the data-group size decoder, the write pointer generator selecting a group of one or more the storage locations to which the data group is written during the write operation, wherein the write pointer generator selects the group according to valid flags in the storage locations and permits selection of the storage locations having address that do not reflect an order of storage of the data group relative to other data groups in the FIFO buffer.

2. The FIFO buffer of claim 1, wherein:

the write control circuit further comprises a data-tag generator that generates a data tag for the write operation; and the write control circuit writes the data tag to the third storage area of each storage location to which a data unit of the data group is written.

3. The FIFO buffer of claim 2, wherein the data-tag generator comprises a counter that counts each time the write control circuit writes a data group, a count from the counter being the data tag from the data-tag generator.

4. The FIFO buffer of claim 1, wherein the write pointer generator selects as the group of storage locations, a first encountered set of consecutive storage locations that is sufficient to store a data group of the number of data units indicated to the a data-group size decoder.

5. The FIFO buffer of claim 1, wherein the write control circuit further comprises logic that decodes valid flags from the storage locations to determine whether the FIFO buffer is full and asserts a full flag if all of the storage location contain valid data.

6. The FIFO buffer of claim 1, further comprising a read control circuit connected to the storage locations, the read control circuit being configured to locate the storage locations which contains a demanded data group and to read the storage location located, wherein the read control circuit locates the storage locations by comparing data tags of storage locations containing valid data to a data tag for a preceding read operation.

7. The FIFO buffer of claim 6, wherein the read control circuit locates and reads the data group by performing a read operation including the sequential steps of:

(a) checking a storage location that a read pointer identifies;

(b) if the checked storage location contains invalid data or a data tag that does not immediately follow a data tag for a preceding read operation, incrementing the read pointer and returning to step (a);

(c) if the checked storage location contains valid data and a data tag that immediately follows the data tag for the preceding read operation, reading the data from the checked storage location and incrementing the read pointer;

(d) checking a storage location that the read pointer identifies;

(e) if the checked storage location contains valid data and a data tag that immediately follows the data tag for the preceding read operation, reading the data from the checked storage location, incrementing the read pointer, and returning to step (d); and (f) if the checked storage location contains invalid data or a data tag that does not immediately follow the data tag for the preceding read operation, outputting a data group containing the data read during preceding steps of the read operation.

8. A first-in-first-out (FIFO) buffer comprising:

a plurality of storage locations, each of the storage locations comprising a first field for storage of a unit of data, a second field for a valid flag indicating whether the first field contains valid data, and a third field for a tag indicating when data was stored in the first field;

a write control circuit coupled to use the valid flags from the second fields of the storage locations when selecting storage locations for a write operation; and a read control circuit coupled to use the tags from the third fields of the storage locations when selecting storage locations for a read operation.

9. The FIFO buffer of claim 8, wherein the write control circuit includes a counter that provides a count that the write control circuit writes to the second fields of the storage locations selected for a write operation, the counter incrementing the count after each write operation.

10. The FIFO buffer of claim 8, wherein the write control circuit is capable of selecting storage locations for a write even when addresses of the storage locations selected do not indicate a relative order in which data was written.

11. A method for operating a first-in-first-out (FIFO) buffer, comprising:

providing in the buffer a plurality of storage locations, each of the storage locations comprising a first field for storage of a data unit, a second field for a valid flag indicating whether the first field contains valid data, and a third field for a tag indicating when data was stored in the first field;

receiving a data group to be written to the buffer;

determining a number of storage locations required for storage of the data group;

checking the second fields of storage locations in the buffer to identify storage locations for storage of the data group, wherein the valid flag in the second field of each identified storage location indicates that the first field of the identified storage location does not store valid data;

writing data units from data group in the first fields of the identified storage locations;

setting the valid flags in the second fields of the identified storage locations to indicate the first fields of the identified storage locations contain valid data; and writing a tag value to all of the third fields of the identified storage locations.

12. The method of claim 11, wherein determining the number of storage locations required comprises inspecting a group size of an incoming data group to determine whether the incoming data group is one, two or four data units long.

* * * * *